(12) United States Patent
Ueda et al.

(10) Patent No.: US 12,251,633 B2
(45) Date of Patent: Mar. 18, 2025

(54) PROGRAM, SERVER, METHOD, AND SYSTEM FOR INCREASING PREDICTABILITY OF ENEMY NEXT ACTION

(71) Applicant: CYGAMES, INC., Tokyo (JP)

(72) Inventors: Keita Ueda, Tokyo (JP); Tatsuya Hasegawa, Tokyo (JP); Makoto Akashio, Tokyo (JP)

(73) Assignee: CYGAMES, INC., Tokyo (JP)

( * ) Notice: Subject to any disclaimer, the term of this patent is extended or adjusted under 35 U.S.C. 154(b) by 251 days.

(21) Appl. No.: 17/902,527

(22) Filed: Sep. 2, 2022

(65) Prior Publication Data
US 2023/0001299 A1    Jan. 5, 2023

Related U.S. Application Data

(63) Continuation of application No. PCT/JP2021/008737, filed on Mar. 5, 2021.

(30) Foreign Application Priority Data

Mar. 6, 2020 (JP) ................................. 2020-038453

(51) Int. Cl.
  *A63F 13/58* (2014.01)
  *A63F 13/533* (2014.01)
  (Continued)

(52) U.S. Cl.
  CPC ........ *A63F 13/5375* (2014.09); *A63F 13/533* (2014.09); *A63F 13/58* (2014.09); *A63F 13/822* (2014.09); *A63F 13/847* (2014.09)

(58) Field of Classification Search
  None
  See application file for complete search history.

(56) References Cited

FOREIGN PATENT DOCUMENTS

JP    6577528 B2    9/2019

OTHER PUBLICATIONS

Granblue Fantasy, Wikipedia, Wayback Machine, https://web.archive.org/web/20190924185930/https://en.wikipedia.org/wiki/Granblue_Fantasy, Sep. 24, 2019 (Year: 2019).*

(Continued)

*Primary Examiner* — Damon J Pierce
(74) *Attorney, Agent, or Firm* — Osha Bergman Watanabe & Burton LLP

(57) ABSTRACT

Provided is a program for a game where a plurality of players battle against a common enemy character, the program causing a computer to execute: storing an enemy common parameter in a storage device commonly to a plurality of items of player identification information; storing enemy next-action information so as to be individually associated with each of the items of the player identification information; executing an action of a player character based on an accepted command input; updating the enemy common parameter on the basis of the action of the player character; executing an action of the enemy character based on the enemy next-action information that is stored in association with the player identification information; deciding as enemy next action on the basis of the enemy common parameter; and updating the enemy next-action information that is associated with the player identifier, based on the decided enemy next action.

11 Claims, 8 Drawing Sheets

(51) Int. Cl.
  *A63F 13/5375* (2014.01)
  *A63F 13/822* (2014.01)
  *A63F 13/847* (2014.01)

(56) References Cited

OTHER PUBLICATIONS

Granblue Fantasy JRPG Gameplay Hell Raid, YouTube, Steparu, https://www.youtube.com/watch?v=2b0H9019iOI, Sep. 18, 2015 (Year: 2015).*

[Granblue Fantasy] Battle basics you need to know to win! Things to be careful of in boss battles [Beginners], Abiko-san, https://abikosan.com/gbf_beginner_battle, Oct. 27, 2018 (Year: 2018).*

International Search Report for corresponding International Application No. PCT/2021/008737, mailed Apr. 6, 2021 (7 pages).

Office Action in counterpart Japanese Patent Application No. 2021-033457 issued on Jul. 19, 2021 (8 pages).

Office Action in counterpart Japanese Patent Application No. 2020-038453 issued on Aug. 31, 2020 (7 pages).

Office Action in counterpart Japanese Patent Application No. 2021-033457 issued on Nov. 24, 2021 (8 pages).

Office Action in counterpart Japanese Patent Application No. 2020-038453 issued on Dec. 10, 2020 (8 pages).

Dragon Quest Walk; How to Challenge Mega Monster Defeat and Strategy, Retrieved from Internet; APPBANK[online] Sep. 14, 2019, URL: https://www.appbank.net/2019/09/14/iphone-application/1794857.php (16 pages).

Dragon Quest Walk, Chapter 4, Episode 9: Hawk Blizzard & Mini Demons!, Retrieved from the Internert. APPMEDIA [online], Nov. 13, 2019, URL:https://appmedia.jp/dqwalk/3890041 (3 pages).

Effects of "Otakebi (war cry)" and learning characters/monsters, God game strategy, Retrieved from the Internet, Aug. 21, 2019, URL:https://kamigame.jp/dq5/page/65806193607573506.html (2 pages).

Pokemon ORAS—Introduction and Explanation of the teaching skill "Kiai Punch", FC2, Retrieved from the Internet, Mar. 28, 2015, URL:http://monokuro6262.blog.fc2.com/blogentry-361.html (3 pages).

About "Black Knight and White Devil King" Battle [Beginner's Strategy], NANASE's App Game Strategy, Retrieved from the Internet, May 29, 2017, URL:http://nanasegame.blog.fc2.com/blogentry-23.html (14 pages).

Final Fantasy XII International Zodiac Job System, Famitsu PLAYSTATION+ vol. 237; Enterbrain Inc., vol. 237, No. 12-11, pp. 40-47 ; Oct. 1, 2007 (11 pages).

Grumble; The basics of battle you need to attack! What to watch out for in boss battles [beginner], Abiko-san @ Ganbaranai, Retrieved from the Internet, Oct. 27, 2018, URL:https://abikosan.com/gbf_beginner_battle (10 pages).

Grumble Starting Today, vol. 2, "Battle," YouTube [video], Retrieved from Internet, Aug. 1, 2017, URL: https://www.youtube.com/watch?v=Bvh07QAxbA (10 pages).

Multibattle, Grumble Beginner's wiki, Retrieved from the Internet,Apr. 5, 2018, URL: https://w.atwiki.jp/gbf_beginner/pages/18.html (6 pages).

"Collected Solarbeams from the first Pokemon to the Fushigibana!" Venusaue Solarbeam, YouTube[video], Retrieved from the Internet, Nov. 18, 2017, URL:https://www.youtube.com/watch?v=gHy7FW4Bf9g (5 page).

Dragon Quest Walk; Mega Monster Defeat Showdown! (Round 4) You can win a crushing victory without paying and without Raijin no Yari Convexity 4! Metal Dragon Megamon] [DQW Live], youtube, Retrieved from the Internet Feb. 10, 2020, <URL:https://www.youtube.com/watch?v=- X_pbRcbfKw (4 pages).

* cited by examiner

FIG.2
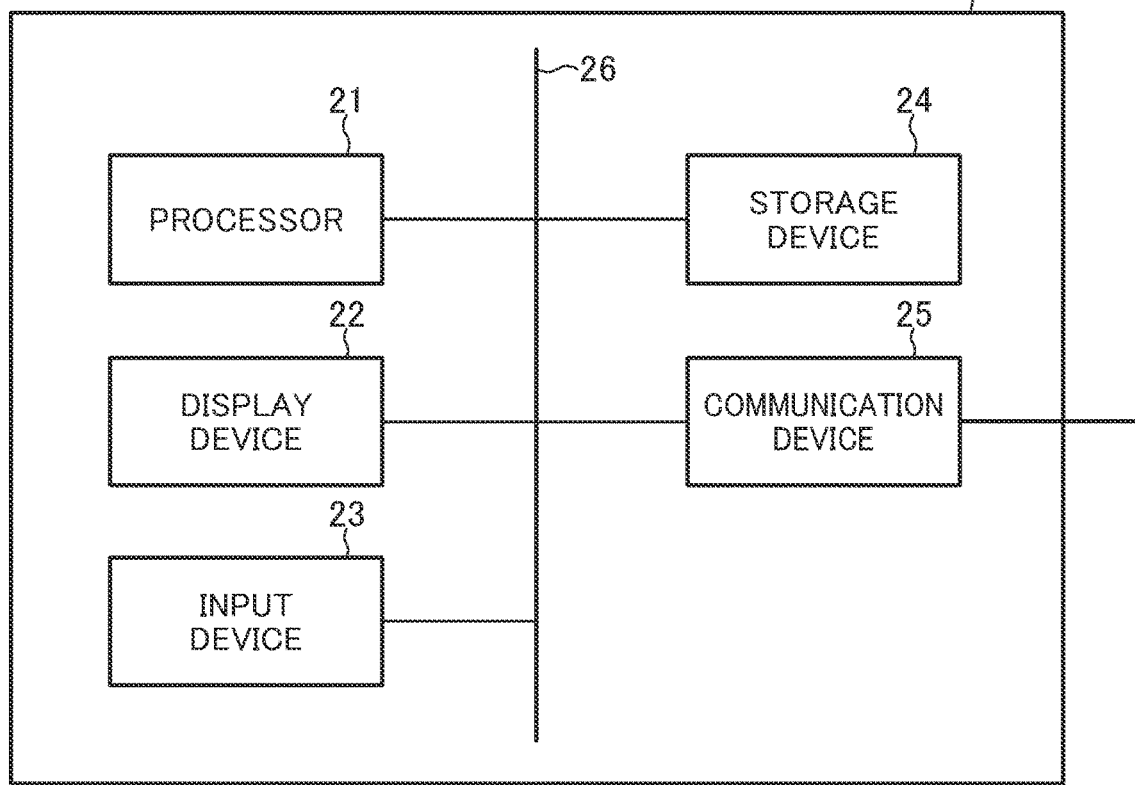
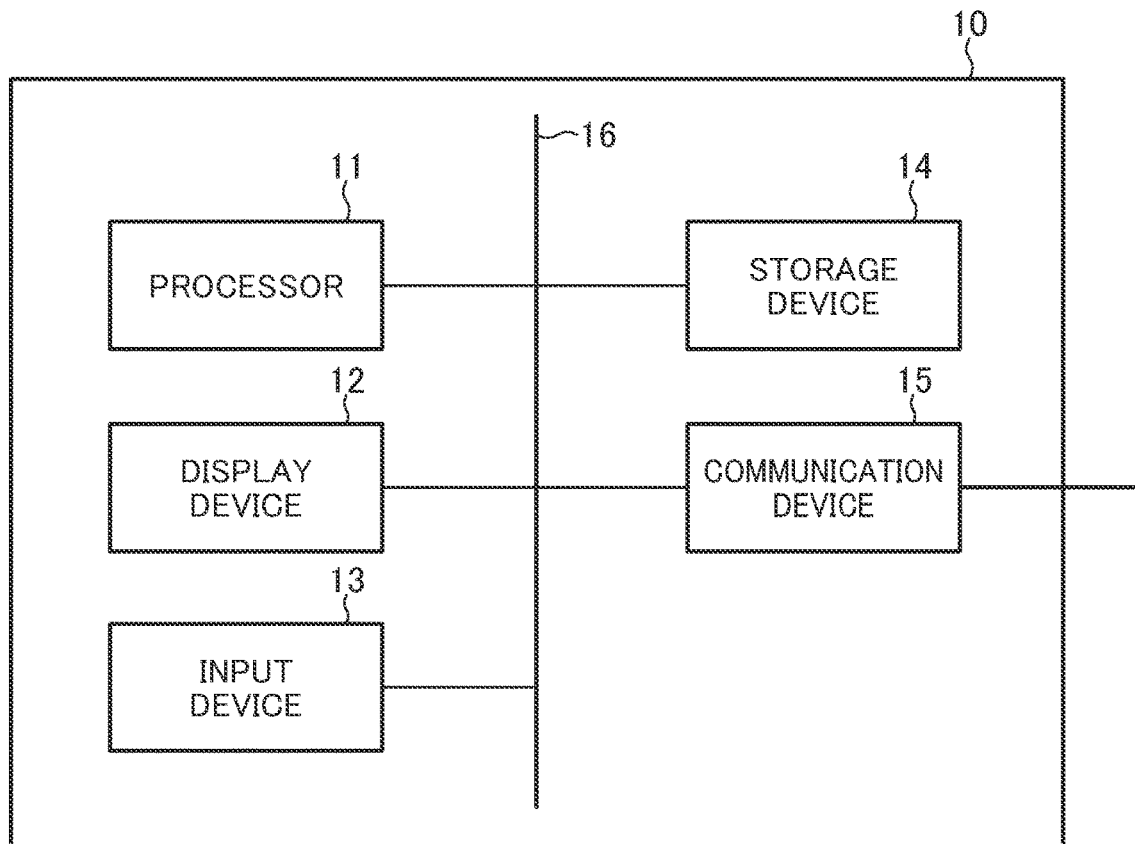

PROGRAM, SERVER, METHOD, AND SYSTEM FOR INCREASING PREDICTABILITY OF ENEMY NEXT ACTION

TECHNICAL FIELD

The present invention relates to a program etc. and relates to a program etc. for improving the predictability of the next action of as enemy character.

BACKGROUND ART

With the spread of online games etc. in recent years, games in which a plurality of players battle against a common enemy character have been released. In such games, there is a known system in which the frequency and the attacking power of an attack by an enemy character on a character of a user are increased in accordance with a period of time during which an operation input of the user is not performed (Patent Literature 1).

CITATION LIST

Patent Literature

{PTL 1} Publication of Japanese Patent No. 6577528

SUMMARY OF INVENTION

Technical Problem

However, in the case where the attacking power and an action of the enemy character are not decided until an operation input of a plater is performed, even though an action of a player character is strategically considered prior to the operation input of the player, and an attack against the enemy character is performed, an unexpected attack by the enemy character is received in some cases. In such cases, the appeal of making a strategy for an action of the player character is reduced, whereby interest in the game might be lost.

The present invention has been made in order to solve the above-described problem, and a main object thereof is to provide a program etc. capable of improving the predictability of the next action of an enemy character.

Solution to Problem

In order to solve the above-described object, according to an embodiment, the present invention provides a program for a game in which a plurality of players battle against a common enemy character, the program causing a computer to execute: a step for storing an enemy common parameter that is an enemy-character parameter common to a plurality of items of player identification information, in a storage device; a step for storing enemy next-action information indicating an enemy next action that is an action planned to be executed next by the enemy character, in the storage device so as to be individually associated with each of the items of the player identification information; a step for accepting a command input performed by each one of the players; a step for executing an action of a player character associated with the player identification information of the player, on the basis of the accepted command input; a step for updating the enemy common parameter, which is stored in the storage device, on the basis of the executed action of the player character; a step for executing an action of the enemy character on the basis of the enemy next-action information that is stored in the storage device in association with the player identification information; a step for deciding an enemy next action on the basis of the enemy common parameter, which is stored in the storage device; and a step for updating the enemy next-action information that is associated with the player identification information in the storage device, on the basis of the decided enemy next action.

Furthermore, it is also possible that a player terminal of each of the players is connected to the computer, and it is also possible to cause the computer to further execute, after executing the step for deciding the enemy next-action information, a step for sending notice information for the decided enemy next action to the player terminal.

It is also possible that: the type of an action of the enemy character includes a first enemy-action type and a second enemy-action type; and the step for sending notice information is executed in the case where the type of an enemy next action is the second enemy-action type.

Furthermore, it is also possible that the type of an action of a player character includes a first player-action type and a second player action type, and it is also possible to cause the computer to execute, in the case where the action executed in the step for executing an action of a player character is an action of the second player-action type, the step for deciding an enemy next action and the step for updating the enemy next-action information, without executing an action of the enemy character.

Furthermore, it is also possible to cause the computer to further execute a step for storing enemy individual parameters that are parameters of the enemy character different for each of the items of the player identification information, in the storage device in association with each of the items of the player identification information, and it is also possible that the step for deciding an enemy next action includes a step for deciding an enemy next action with respect to each of the items of the player identification information, on the basis of the enemy common parameter and the enemy individual parameters that are stored in association with this player identification information.

It is also possible that the enemy next-action information includes an action name and an action target.

It is also possible that the enemy next-action information, which is associated with each of the items of the player identification information, includes a suspension condition for suspending the enemy next acton, and it is also possible to cause the computer to further execute: a step for judging whether the suspension condition, which is included in the enemy next-action information, has been satisfied; and a step for updating the enemy next-action information of which the suspension condition is judged to have been satisfied, to enemy next-action information indicating another enemy next action.

It is also possible to cause the computer to further execute a step for sending suspension information for notifying the corresponding player that the enemy next action has been changed, to the corresponding player terminal.

According to another embodiment, the present invention provides a server for a game in which a plurality of players battle against a common enemy character, the server storing an enemy common parameter that is an enemy-character parameter common to a plurality of items of player identification information, in a storage device; storing enemy next-action information indicating an enemy next action that is an action planned to be executed next by the enemy character, in the storage device so as to be individually associated with each of the items of the player identification information; accepting a command input performed by each one of the players; executing an action of a player character associated with the player identification information of the player, on the basis of the accepted command input; updating the enemy common parameter, which is stored in the storage device, on the basis of the executed action of the player character; executing an action of the enemy character on the basis of the enemy next-action information that is stored in the storage device in association with the player identification information; deciding an enemy next action on the basis of the enemy common parameter, which is stored in the storage device; and updating the enemy next-action information that is associated with the player identification information of the player in the storage device, on the basis of the decided enemy next action.

According to still another embodiment, the present invention provides a method for a game in which a plurality of players battle against a common enemy character, the method in which a computer executes: a step for storing an enemy common parameter that is an enemy-character parameter common to a plurality of items of player identification information, in a storage device; a step for storing enemy next-action information indicating an enemy next action that is an action planned to be executed next by the enemy character, in the storage device so as to be individually associated with each of the items of the player identification information; a step for accepting a command input performed by each one of the players; a step for executing an action of a player character associated with the player identification information of the player, on the basis of the accepted command input; a step for updating the enemy common parameter, which is stored in the storage device, on the basis of the executed action of the player character; a step for executing an action of the enemy character on the basis of the enemy next-action information that is stored in the storage device in association with the player identification information; a step for deciding an enemy next action on the basis of the enemy common parameter, which is stored in the storage device; and a step for updating the enemy next action information that is associated with the player identification information in the storage device, on the basis of the decided enemy next action.

According to still another embodiment, the present invention provides a system for a game in which a plurality of players battle against a common enemy character, the system comprising a server and a player terminal of each of the players that is connected to the server, the server storing an enemy common parameter that is an enemy-character parameter common to a plurality of items of player identification information, in a storage device; storing enemy next-action information indicating an enemy next action that is an action planned to be executed next by the enemy character, in the storage device so as to be individually associated with each of the items of the player identification information; accepting a command input performed by each one of the players; executing an action of a player character associated with the player identification information of the player, on the basis of the accepted command input; updating the enemy common parameter, which is stored in the storage device, on the basis of the executed action of the player character; executing an action of the enemy character on the basis of the enemy next-action information that is stored in the storage device in association with the player identification information; deciding an enemy next action on the basis of the enemy common parameter, which is stored in the storage device; and updating the enemy next-action information that is associated with the player identification information in the storage device, on the basis of the decided enemy next action, and the player terminal accepting a command input performed by the corresponding player and sending the command input to the server.

Advantageous Effects of Invention

According to the present invention, it is possible to improve the predictability of the next action of an enemy character.

BRIEF DESCRIPTION OF DRAWINGS

FIG. 2 is a diagram showing the hardware configuration of the system according to the embodiment of the present invention.

DESCRIPTION OF EMBODIMENTS

A game system 1 according to an embodiment of the present invention will be described below with reference to the accompanying drawings. In this specification, for convenience of description, there are cases where descriptions that are more detailed than necessary are omitted. For example, there are cases where detailed descriptions of matters that are already well known and repeated descriptions of substantially the same configurations are omitted.

Figure 1:
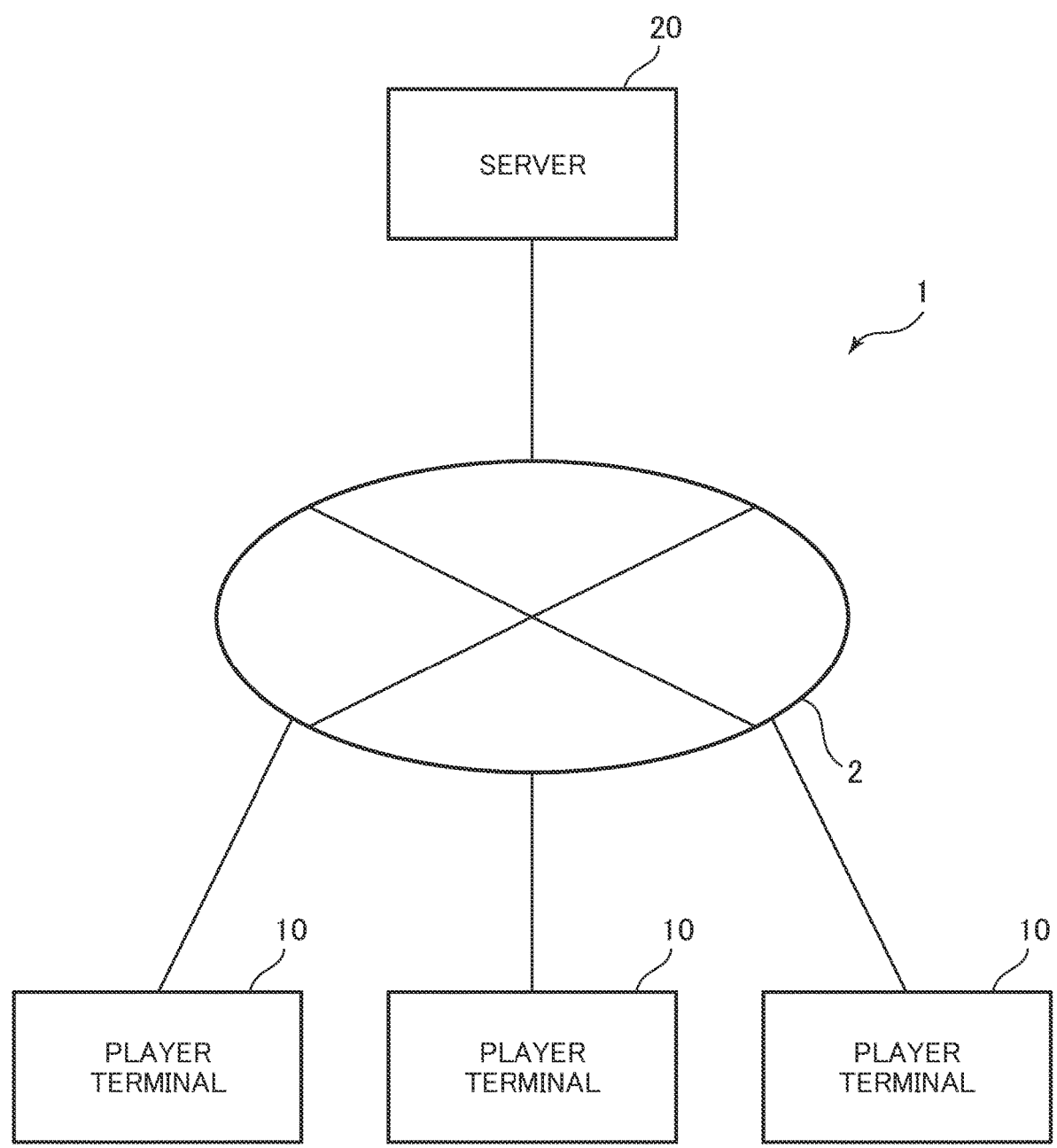
FIG. 1 is a view showing the configuration of a system according to one embodiment of the present invention.

It is assumed that the game system 1 is realized by a system in which a plurality of player terminals are connected to a server via a network. FIG. 1 shows an example of the overall configuration of the game system 1 according to the embodiment of the present invention. As shown in FIG. 1, the game system 1 includes a plurality of player terminals 10 and a server 20, and the player terminals 10 and the server 20 are connected to a network 2 such as the Internet, thus being allowed to communicate with each other. Note that a description will be given of an example case in which the game system 1 of this embodiment is assumed to be a server/client system.

FIG. 2 is a block diagram showing the hardware configurations of each of the player terminals 10 and the server 20 of the embodiment of the present invention. The player terminal 10 includes a processor 11, a display device 12, an input device 13, a storage device 14, and a communication device 15. These individual constituent devices are connected by a bus 16. Note that it is assumed that interfaces are interposed as needed between the bus 16 and the individual constituent devices. In this embodiment, the player terminal 10 is a smartphone. Alternatively, the player terminal 10 can be an electronic device, such as a tablet computer, a personal computer, or a game device, as long as the electronic device includes the configuration described above.

Similarly, the server 20 includes a processor 21, a display device 22, an input device 23, a storage device 24, and a communication device 25. These individual constituent devices are connected by a bus 26. Note that it is assumed that interfaces are interposed as needed between the bus 26 and the individual constituent devices. In this embodiment, the server 20 is realized by a computer.

The processors 11 and 21 control the overall operations at the electronic device 10 and the server 20, respectively, and are, for example, CPUs. Note that electronic circuits such as MPUs may also be used as the processors 11 and 21. The processors 11 and 21 execute various kinds of processing by loading and executing programs and data stored in the storage devices 14 and 24, respectively. In one example, the processors 11 and 21 are each configured of a plurality of processors.

The display, devices (displays) 12 and 22 display application screens etc. to a user (player) of the electronic device 10 and a user (administrator) of the server 20, under the control of the processors 11 and 21, respectively. The display devices 12 and 22 are preferably liquid crystal displays or may be displays using organic EL, plasma displays, or the like.

The input devices 13 and 23 are user interfaces for accepting inputs from the users to the electronic device 10 and the server 20, respectively, and are, for example, touchscreens, touchpads, keyboards, or mouses. In this embodiment, since the electronic device 10 is a smartphone, the electronic device 10 includes a touchscreen as the input device 13, and the touchscreen also functions as the display device 12, whereby the display device 12 and the input device 13 have an integrated structure. The display device 12 and the input device 13 may have separate forms disposed at different positions. Since the server 20 is a computer, it is assumed that the server 20 includes a keyboard and a mouse as the input device and includes a liquid crystal display as the display device.

The storage devices 14 and 24 are storage devices included in general smartphones and computers, such as magnetic storage devices and storage devices that use RAMs, which are volatile memories, and flash memories, which are non-volatile memories, such as eMMCs, UFSs, or SSDs. The storage devices 14 and 24 may also include external memories. For example, the storage device 14 stores a browser program and a game program, and the storage device 24 stores a game program for the server. The browser program and the game program are activated in response to operations by the user on the player terminal 10 and are executed on an operating system (OS) installed in the player terminal 10 in advance. The game program for the server includes various kinds of data and functions for performing information processing so as to appropriately proceed with a game on the browser program and the game program executed at each of the player terminals, which serve as clients.

In one example, the storage devices 14 and 24 include main storage devices and auxiliary storage devices. The main storage devices are volatile storage media that allow high-speed reading and writing of information and are used as storage areas and work areas when the processors 11 and 21 process information. The auxiliary storage devices store various programs and data used by the processors 11 and 21 when the individual programs are executed. The auxiliary storage devices are, for example, hard disk devices; however, the auxiliary storage devices may each be any type of non-volatile storage or non-volatile memory that is capable of storing information, and may be detachable. For example, the auxiliary storage devices each store an operating system (OS), middleware, application programs, various kinds of data that may be referred to when these programs are executed, etc. Furthermore, as the storage devices, it is also possible to use databases that are physically separated from the player terminal 10 and the server 20.

The communication devices 15 and 25 send data to and receive data from other devices via the network 2 (not shown in FIG. 2). For example, the communication devices 15 and 25 perform wireless communication, such as mobile communication or wireless LAN communication, to connect to the network 2. The player terminal 10 performs communication with the server 20 via the network by using the communication device 15. The communication devices 15 and 25 may also perform wired communication using an Ethernet (registered trademark) cable or the like.

Figure 3:
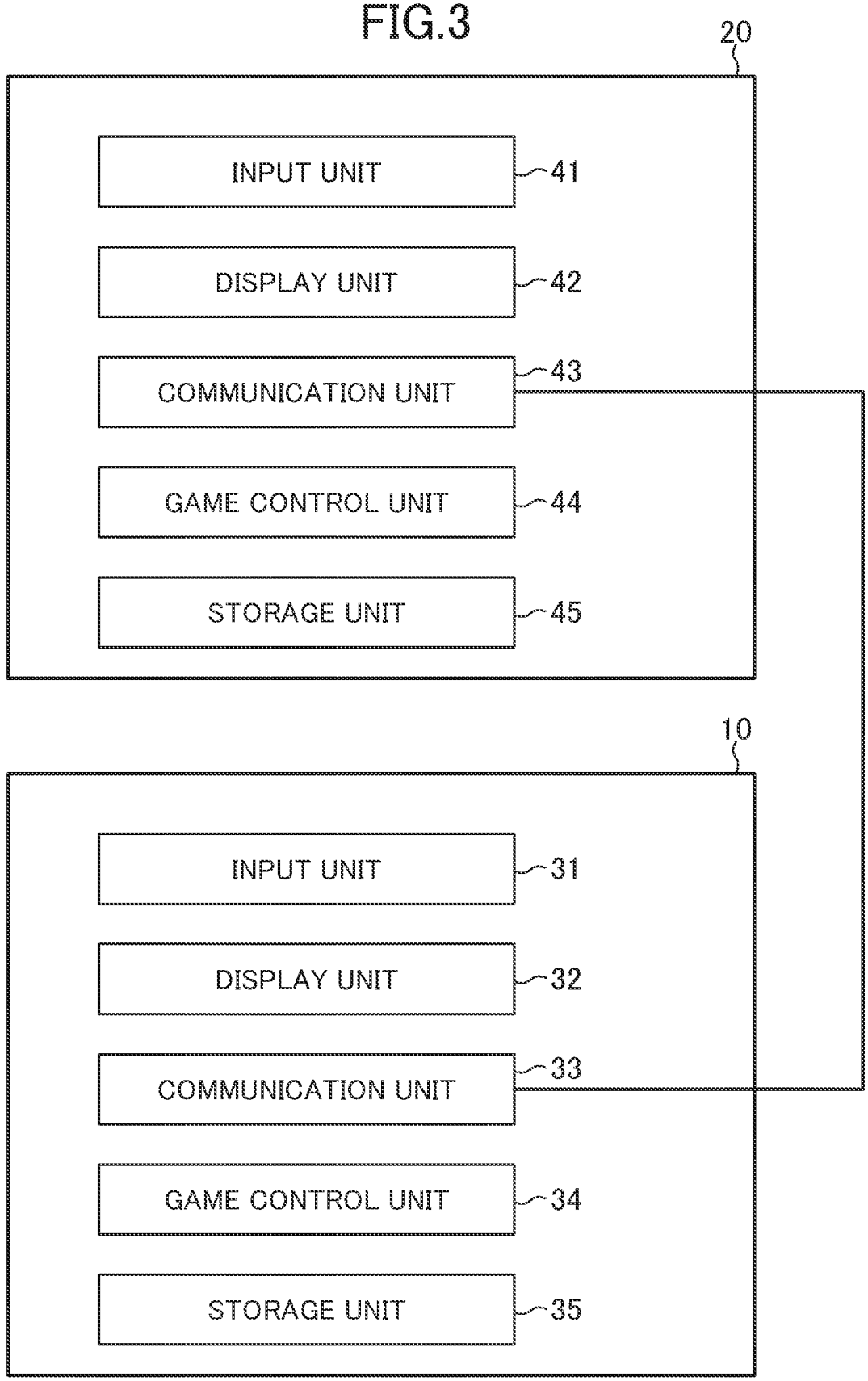
FIG. 3 is a functional block diagram of the system according to the embodiment of the present invention.

FIG. 3 shows examples of functional block diagrams of the player terminal 10 and the server 20 according to the embodiment of the present invention. The player terminal 10 includes an input unit 31, a display unit 32, a communication unit 33, a game control unit 34, and a storage unit 35. The server 20 includes an input unit 41, a display unit 42, a communication unit 43, a game control unit 44, and a storage unit 45. In this embodiment, these functions are realized when the processors 11 and 21 execute programs. For example, the programs to be executed are the browser program and the game programs stored in the storage devices 14 and 24. Since various kinds of functions are realized by loading the programs, as described above, a portion or the entirety of one part (function) may be provided in another part. Alternatively, these functions may be realized by means of hardware by configuring electronic circuits or the like for realizing the individual functions in part or in their entirety.

The input units 31 and 41 are configured by using the input devices 13 and 23, respectively, and accept inputs from the users to the player terminal 10 and the server 20. The player terminal 10 and the server 20 accept user inputs by means of the input units 31 and 41, respectively. The user inputs may include, for example, command inputs indicating commands from the player in the game. In this embodiment, a touch detection function that is generally provided in the smartphone, which has the touchscreen, can be used at the player terminal 10.

The display unit 32 of the player terminal 10 displays game screens by using the display device 12 and displays game screens in accordance with the proceeding of the game and user operations. The display unit 42 of the server 20 displays, on the display device 22, management screens for the panic administrator as needed.

The game control units 34 and 44 store, in the storage units 35 and 45, various: kinds of data needed for control processing and processing that are performed when the game of this embodiment is executed. In this embodiment, the game control unit 34 of the player terminal 10 is realized by using the browser program, and performs processing on input/output information for the user, processing on sent/received signals for the server 20, and the like. The game control unit 34 may also be realized by installing the game application in the player terminal 10.

The game control unit 44 of the server 20 is realized when the game program for the server is executed, and performs processing for the game executed at the player terminal 10. In one example, when the browser is activated at the player terminal 10, the game control unit 34 is realized, and the server 20 is accessed in order to proceed with the game, the game control unit 44 sends data thereto and receives data therefrom regularly or as needed, to proceed with the game. For example, the game control unit 44 stores, in the storage unit 45, various kinds of data etc. needed for control processing when the game of this embodiment is executed, and appropriately provides the data etc. to the player terminal 10. The various kinds of data include: an enemy common parameter that is an enemy-character parameter common to a plurality of items of player identification information; enemy individual parameters that are stored in association with each player; and the like. The enemy individual parameters can include enemy next-action information indicating an enemy next action that is an action planned to be executed next by the enemy character. The enemy next-action information may include information about an action(s) planned to be executed after the next action by the enemy.

The game control unit 44 executes an action of a player character on the basis of a command input received via the communication unit 43, updates the enemy common parameter, which is stored in the storage unit 45, on the basis of the executed action of the player character, executes, with respect to the player, an action of the enemy character on the basis of the enemy next-action information that is stored in the storage unit in association with the player identification information of the player, decides, after the execution of the action of the enemy character, an enemy next action with respect to the player on the basis of the enemy common parameter, which is stored in the storage unit 45, and updates the enemy next-action information, in the storage unit 45, associated with the player identifier of the player, on the basis of the decided enemy next action.

The storage units 35 and 45 are configured by using the storage devices 14 and 24, respectively. In the storage unit 45 of the server 20, the enemy common parameter, which is an enemy-character parameter common to the plurality of items of player identification information, is stored commonly to the plurality of items of player identification information, the enemy next-action information indicating the enemy next action, which is an action planned to be executed next by the enemy character, is stored so as to be individually associated with the player identification information of each player, and the enemy individual parameters are stored in association with the player identification information of each player. The storage unit 35 of the player terminal 10 is used to store information, for the player terminal 10, received from the server 20.

In this embodiment, a battle parameter table for a battle in which a plurality of players battle against a common enemy character is stored in the storage unit 45 of the server 20. The battle parameter table can include identification information of the enemy character in the battle, items of player identification information of the players who participate in the battle, an enemy-character parameter that is common to all the items of player identification information, and enemy individual parameters that are individually associated with the items of player identification information and that are different for each of the players. The enemy individual parameters can include enemy next-action information indicating an enemy-character action planned to be executed next. Table 1 shows an example of the battle parameter table.

TABLE 1

(Battle Parameter Table)

| Enemy ID | Enemy HP | PID | Enemy CT | Enemy next action ID | PCID | PCHP | Enemy next action target |
|---|---|---|---|---|---|---|---|
| 1 | 567 | 755 | 3 | 2 | 39 | 782 | 1 |
|  |  |  |  |  | 45 | 719 | 1 |
|  |  |  |  |  | 76 | 15 | 1 |
|  |  |  |  |  | 91 | 389 | 1 |
|  |  | 332 | 1 | 4 | 55 | 888 | 1 |
|  |  |  |  |  | 80 | 516 | 0 |
|  |  |  |  |  | 14 | 472 | 0 |
|  |  |  |  |  | 22 | 56 | 0 |
| ... |

An enemy ID indicates identification information of the enemy character, an enemy HP indicates the remaining hit points (HP) of the enemy character, and a PID indicates identification information of a player participating in the battle. Since the enemy HP is an enemy-character parameter common to the items of identification information of all players participating in the battle, the enemy HP is stored in association with all PIDs.

The enemy individual parameters, which are individually associated with each of the PIDs, include enemy CT, an enemy next action, and enemy-next-action-target information. Furthermore, individual player parameters for each player include a PCID and a PCHP.

The enemy CT is enemy charge-turn information that is changed in accordance with the proceeding of the game for each player. The enemy CT has an integer value from 0 to a maximum value, and the maximum value can be set in advance for each enemy character. The charge turn is incremented by one when an action of the enemy character is executed, and, when the charge turn is increased up to the maximum value, a special action is executed, whereby the charge turn is returned to 0. Alternatively, it is also possible that the charge turn is changed due to an action of the player character or varies due to the enemy HP. It is obvious to those skilled in the art that the present invention can be implemented even if the enemy CT is not included in a modification. An enemy next-action ID is action identification information indicating an enemy-character action planned to be executed next with respect to the associated PID.

The PCID is identification information of a player character operated by the player and is stored in association with the PID. In this embodiment, although a plurality of PCIDs are associated with one PID such that one player can operate a plurality of player characters, it is also possible that only one PCID is associated with one PID such that one player operates only one player character. In that case, the PCID and the enemy-next-action-target information may also be omitted. The PCHP and the enemy-next-action-target information are associated with the PCID. The PCHP is the remaining HP of the associated player character, and the enemy-next-action target is information indicating whether the associated player character is a target of the enemy next action. It is assumed that the associated player character is a target of the enemy next action when the enemy-next-action-target information is set to "1", and is not a target thereof when the enemy-next-action-target information is set to "0".

The storage unit 45 of the server 20 can further store an enemy parameter table. The enemy parameter table can include information indicating basic parameters, an action type, an action content, etc., of an enemy character. Table 2 shows an example of the enemy parameter table.

TABLE 2

(Enemy Parameter Table)

| Enemy ID | Base | Action ID | Action type | Action name | Occurrence condition | Suspension condition | Action content |
|---|---|---|---|---|---|---|---|
| 1 | 90/897/3 | 1 | 0 | Normal attack | — | — | 1 attack |
|  |  | 2 | 1 | Special attack A | 50% ≥ HP > 40% | Attacked >4 times | 4 R-attacks |
|  |  | 3 | 1 | Special attack B | Enemy CT = Maximum | Enemy CT ≠ Maximum | 10 R-attacks, Increase in attacking power |
| 2 | 22/678/2 | 1 | 0 | Normal attack | 90% ≥ HP > 80% | — | 1 attack |
|  |  | 2 | 1 | Special attack G | 20% ≥ HP > 10% | Suspension action | 1 attack on all |
|  |  | 3 | 1 | Special attack H | — | — | 2 attacks on all |

It is assumed that an enemy ID is identification information of an enemy character and is stored, here, is association with base parameters, an action ID, an action type, an action name, an occurrence condition, a suspension condition, and an action content. It is assumed that the base parameters indicate basic parameters of an enemy character and include the attacking power, the maximum HP, and the maximum enemy CT. For example, the enemy character of which the enemy ID is 1 has an attacking power of 90, a maximum HP of 897, and a maximum enemy CT of 3.

The action ID is identification information indicating an action that can be executed by each enemy character. It is assumed that the action type indicates the type of an action and includes first and second action types (enemy action types). It is assumed that as action type "0" means a normal attack, and an action type "1" means a special attack. The action name, in which a plurality of special attacks may be defined as a special attack, indicates the name of an action.

The occurrence condition means a condition under which the corresponding action occurs. For example, when the enemy ID is "1", and the action ID is "1", the action type is "0", which means the normal attack, and an occurrence condition "—" indicates that the normal attack can be executed without satisfying a specific occurrence condition. On the other hand, when the action ID thereof is "2", the action type is which means a special attack. Then, since the occurrence condition is "50%≥HP>40%", it is indicated that the special attack can be executed when the remaining HP of the enemy character satisfies 50%≥HP>40%. The action for which the occurrence condition is set can be executed only once with respect to each player. For example, information indicating that the corresponding action has been executed with respect to each player can be recorded in the battle parameter table.

The suspension condition indicates a condition under which, in the case where the corresponding action is planned as a next action, this action is suspended and is changed to another action. A suspension condition "—" indicates that the action cannot be suspended, and a suspension condition "attacked>4 times" indicates that execution of the action serving as a next action is cancelled in the case where 4 or more attacks are received from a player character(s) before the next action is executed. In the case where the suspension condition is "suspension action", it is indicated that the enemy next action is cancelled when a player character executes the suspension action. In the case where the occurrence condition is "enemy CT=maximum", and the suspension condition is "enemy CT≠maximum", this means that the special action is suspended when the enemy CT is changed to be no longer the maximum due to, for example, execution of the ability of a player character. When the enemy next action is cancelled, for example, the next action is changed to the normal action.

The action content indicates the content of an action. For example, "4 R-attacks" means that a player character serving as an attack target is randomly selected 4 times, and attacks are made on the selected player(s), and "2 attacks on all" means that two attacks are made on all the player characters of the players.

The storage unit 45 of the server 20 can further store a player parameter table. In the player parameter table, player-character identification information is associated with the player identification information. Table 3 shows an example of the player parameter table.

TABLE 3

(Player Parameter Table)

| PID | PCID |
|---|---|
| 1 | 15 |
|  | 12 |
|  | 5 |
|  | 7 |
| 2 | 9 |
|  | 12 |
|  | 87 |
|  | 53 |
|  | . . . |

Table 3 shows that PCIDs are stored in association with a PID. Here, it is indicated that four PCIDs are stored in association with one PID, whereby one player can operate four player characters. Although each player performs an input, at the player terminal 10, to select player characters that the player wishes to operate, thereby making it possible to change the player parameter table, it is also possible that PCIDs are fixedly assigned to a PID in advance.

The storage unit 45 of the server 20 can further store a player-character parameter table. The player-character parameter table can include information indicating basic parameters, an action type, an action content, etc. of each player character. Table 4 shows an example of the player-character parameter table.

TABLE 4

(Player-Character Parameter Table)

| PC ID | Base | Action ID | Action type | Action content |
|---|---|---|---|---|
| 1 | 80/ 768 | 1 | 0 | 1 attack |
|  |  | 2 | 1 | 1 attack on all |
|  |  | 3 | 1 | Increase in attacking power |
|  |  | 4 | 1 | 4 R-attacks |
|  |  | 5 | 1 | Suspension action |
| 2 | 33/ 462 | 1 | 0 | 1 attack |
|  |  | 2 | 1 | HP restoration |
|  |  | 3 | 1 | 1 attack on all |
|  |  | 4 | 1 | Increase in attacking power |
|  |  | 5 | 1 | Decrease in enemy attacking power |
| ... |  |  |  |  |

It is assumed that the PCID is identification information of a player character and is stored in association with base parameters, an action ID, an action type, and an action content. It is assumed that the base parameters indicate the basic parameters of a player character and include the attacking power and the maximum HP. For example, the player character of which the PCID is 1 has an attacking power of 80 and a maximum HP of 768. The action ID is identification information indicating an action that can be executed by the player character of each PCID. It is assumed that the action type indicates the type of an action and includes first and second action types (player action types). Here, it is assumed that a normal attack is defined as the first action type (player action type), and a plurality of abilities are defined as the second action type (player action type). It is assumed that an action type "0" means a normal attack, and an action type "1" means any of the abilities.

As will be described later, when an action of the first action type is executed, an action of the enemy character is executed next, and, in the case where an action of the second action type is executed, an action of the enemy character will not be executed next, and an action of the player character is further decided and executed by the player. However, an action of the same second action type cannot be executed again until an enemy action is executed a predetermined number of times.

As a normal attack, an attack by each player character is executed. As an ability, it is possible to execute an attack against the enemy character, strengthening of an ally character, weakening of the enemy character, a suspension action for an enemy special action, or the like. For example, when the PCID is "1", and the action ID is "1", the action type is "0", and the action content is "1 attack", whereby the action type is the normal attack, and one attack is performed. When the action ID is "2", the action type is "1", which means an ability, and the action content is "one attack on all", which means that, in the case where there are a plurality of enemy characters, one attack is performed on all the enemy characters.

Although a description will be given of a case in which the number of action types of an enemy character and the number of action types of a player character are each 2, the number of action types may also be 3 or more or 1.

Figure 4:
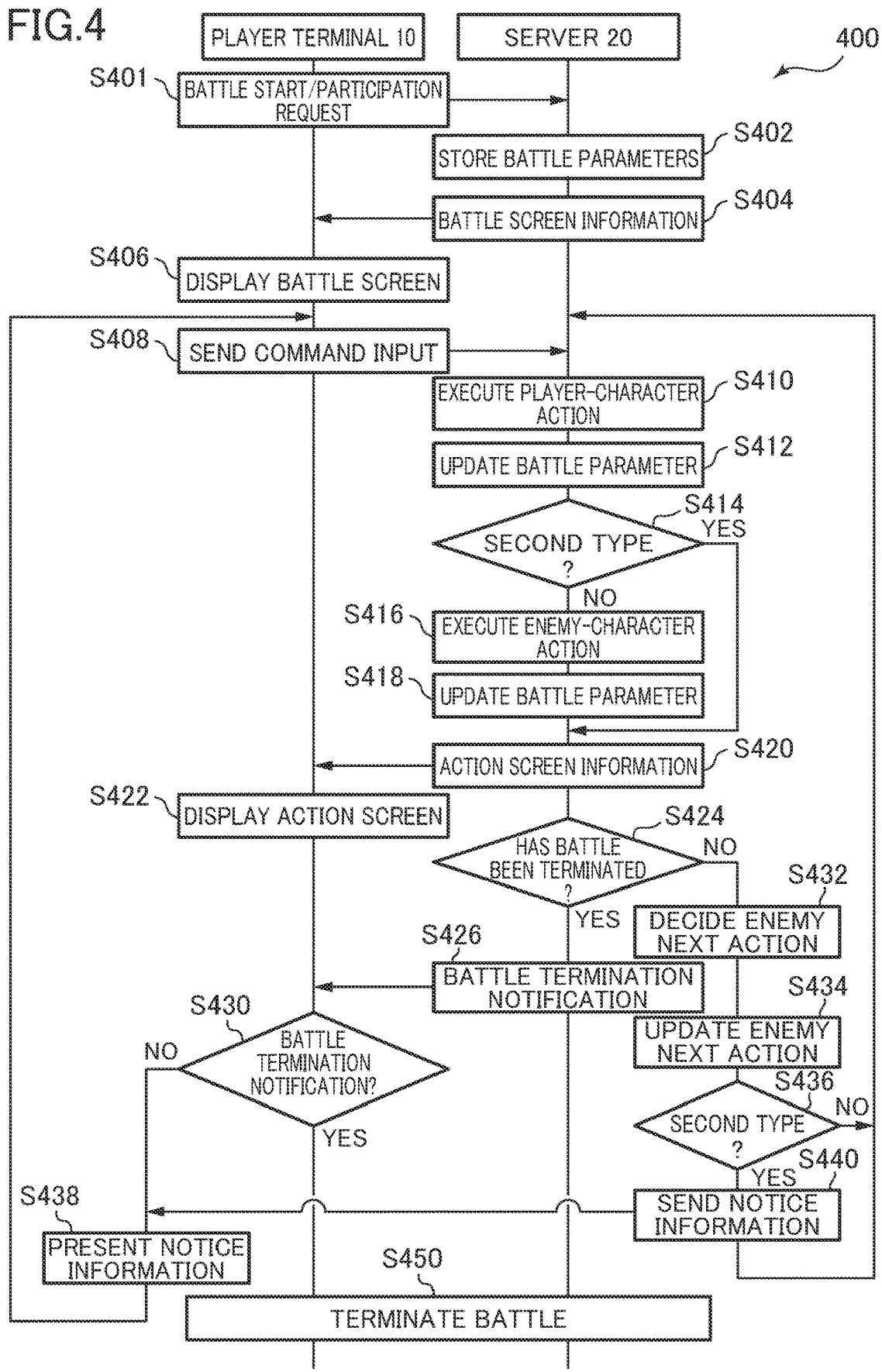
FIG. 4 is a flowchart showing information processing according to the embodiment of the present invention.

Next, information processing executed in the game system 1 according to the embodiment of the present invention will be described below by using a flowchart shown in FIG. 4. The game system of this embodiment is a system for a game in which a plurality of players battle against a common enemy character. The player terminals 10 of the individual players are connected to the server 20, and the aim of the game is to defeat the enemy character in cooperation with each other. The plurality of players perform attacks against the common enemy, the side of the players wins when the HP of the common enemy character becomes zero, and the side of the enemy character wins when the HPs of player characters of all the players become zero.

Whereas the HP of the common enemy character is common to all the players who participate in the battle, the enemy individual parameters, such as the enemy next action and the enemy CT, are decided and stored individually for each of the players. The flowchart shown in FIG. 4 shows information processing executed between the server 20 and one of the player terminals 10, and similar processing is separately executed in parallel with respect to the player terminals 10 of all the players who participate in the battle. The processing executed in parallel can be individually executed in association with, for example, the PIDs. Accordingly, each of the players is allowed to proceed with the battle by using the enemy individual parameters, which are different for each of the players, while using the enemy common parameter, which is the enemy HP common to all the players. A player mentioned in relation to the flowchart shown in FIG. 4 means the player of the player terminal 10 that executes the information processing of the flowchart, a PID is the PID of this player, and a player character is a player character that is associated with this PID.

First, any one of the players performs an operation input via the corresponding player terminal 10 and sends a battle start request to the server 20 (S401). When the battle start request is received, the server 20 generates the battle parameter table, which is illustrated in Table 1, on the basis of the player ID (PIP) included in the battle start request and stores the battle parameter table in the storage unit 45 (S402). It is also possible that a plurality of players make a battle start request in cooperation with each other.

The battle parameter table can be generated with reference to the enemy parameter table (Table 2) and the player parameter table (Table 3) on the basis of the enemy ID, which indicates the battle target selected by the player(s), and the PID (s) of the player(s). For example, it is possible that the initial HPs of the enemy character and the player characters are obtained from Tables 2 and 3 and are set as initial values of the enemy HP and the PCHPs, and an enemy next action is decided on the basis of the initial HP of the enemy character. Here, although a description will be given of an example case where there is one enemy character, even in the case where there are a plurality of enemy characters, the present invention can be implemented by executing similar processing with respect to each of the enemy characters.

A player who is going to participate in the battle that has already been started by another player can participate in the battle by selecting the battle to participate in and making a battle participation request (S401), instead of making a battle start request. In the case where a player has participated in the started battle, information related to the player who has newly participated is added to the battle parameters shown in Table 1. The enemy HP, which is the enemy common parameter, is associated in common with the PIDs of the other players.

In this embodiment, it is assumed that the battle parameter table is common to the players who participate in the battle, and the same parameter table is accessed by the individual player terminals; however, regarding the individual parameters for the players, it is also possible to generate and manage separate tables for the individual players. Regarding the enemy common parameter, it is possible to generate and manage individual tables as long as the tables are designed such that the common value is referred to by the players.

The server 20 generates battle screen information corresponding to the PID and sends the battle screen information to the player terminal 10 associated with this PID (S404). Here, it is assumed that screen information including images of the enemy character and the player characters that are associated with this PID is generated. The screen information may also include information about names, icons, etc. of the other players.

When the battle screen information is received, the player terminal 10 displays a battle screen including a command input button, on the display unit 32 (S406). Then, the player terminal 10 awaits a command input from the player, and, when the input unit 31 accepts a command input from the player, sends the command input to the server 20 via the communication unit 33 (S408).

Figure 5:
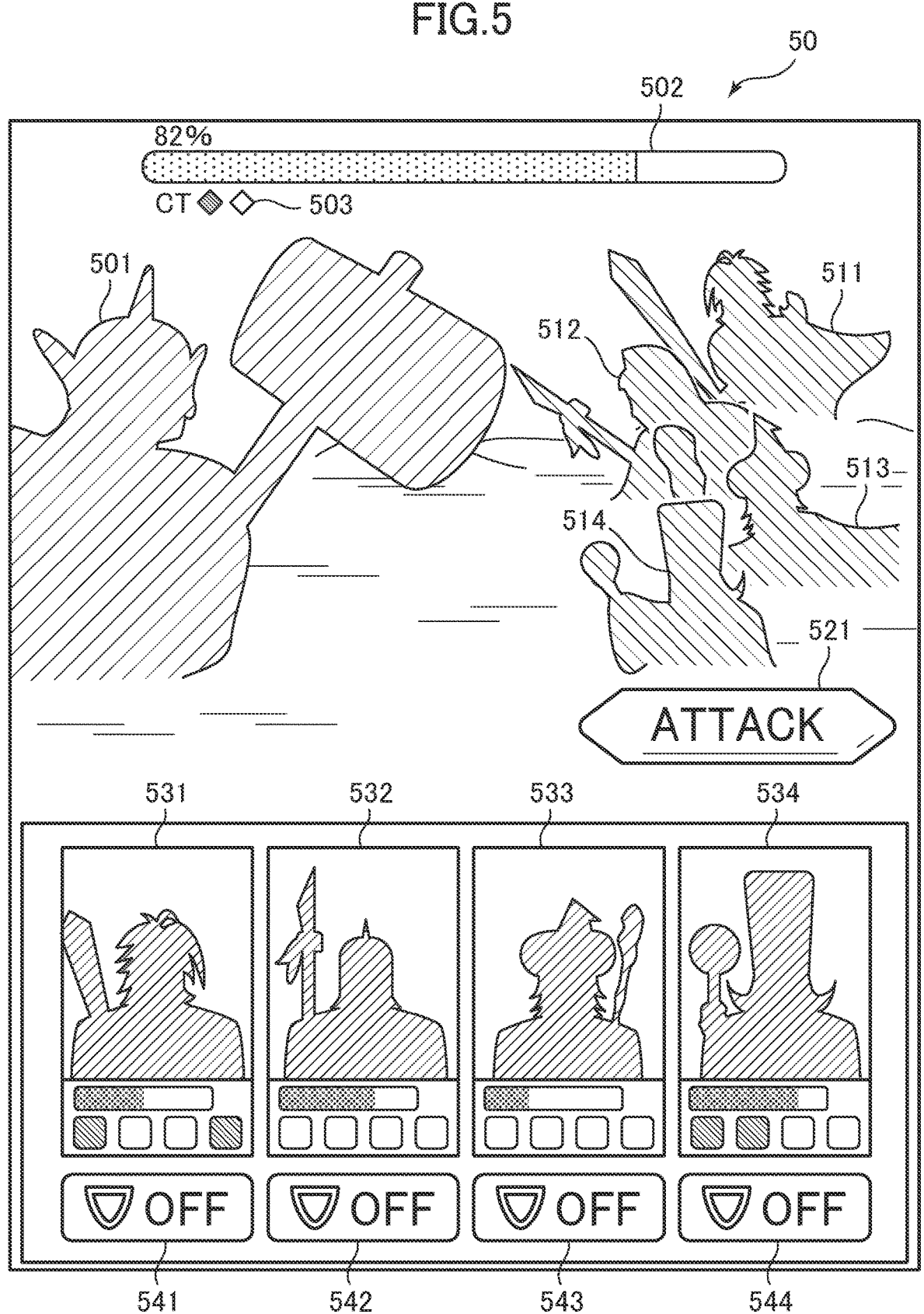
FIG. 5 shows an example of a game screen according to the embodiment of the present invention.

FIG. 5 shows as example of the battle screen. The battle screen includes an enemy-character image 501, a remaining HP 502 and enemy CT information 503 of the enemy character, player-character images 511 to 514, a first-action button 521, second-action display command buttons 531 to 534, and defense buttons 541 to 544.

The first action type corresponds to the normal attack, and the first-action button is displayed as the attack button 521. When the input unit 31 of the player terminal 10 detects a touch on this button by the player, the input unit 31 accepts the touch as a command input indicating that the player character issues a command to execute the normal attack, and the command input is sent to the server 20 via the communication unit 33.

Figure 6:
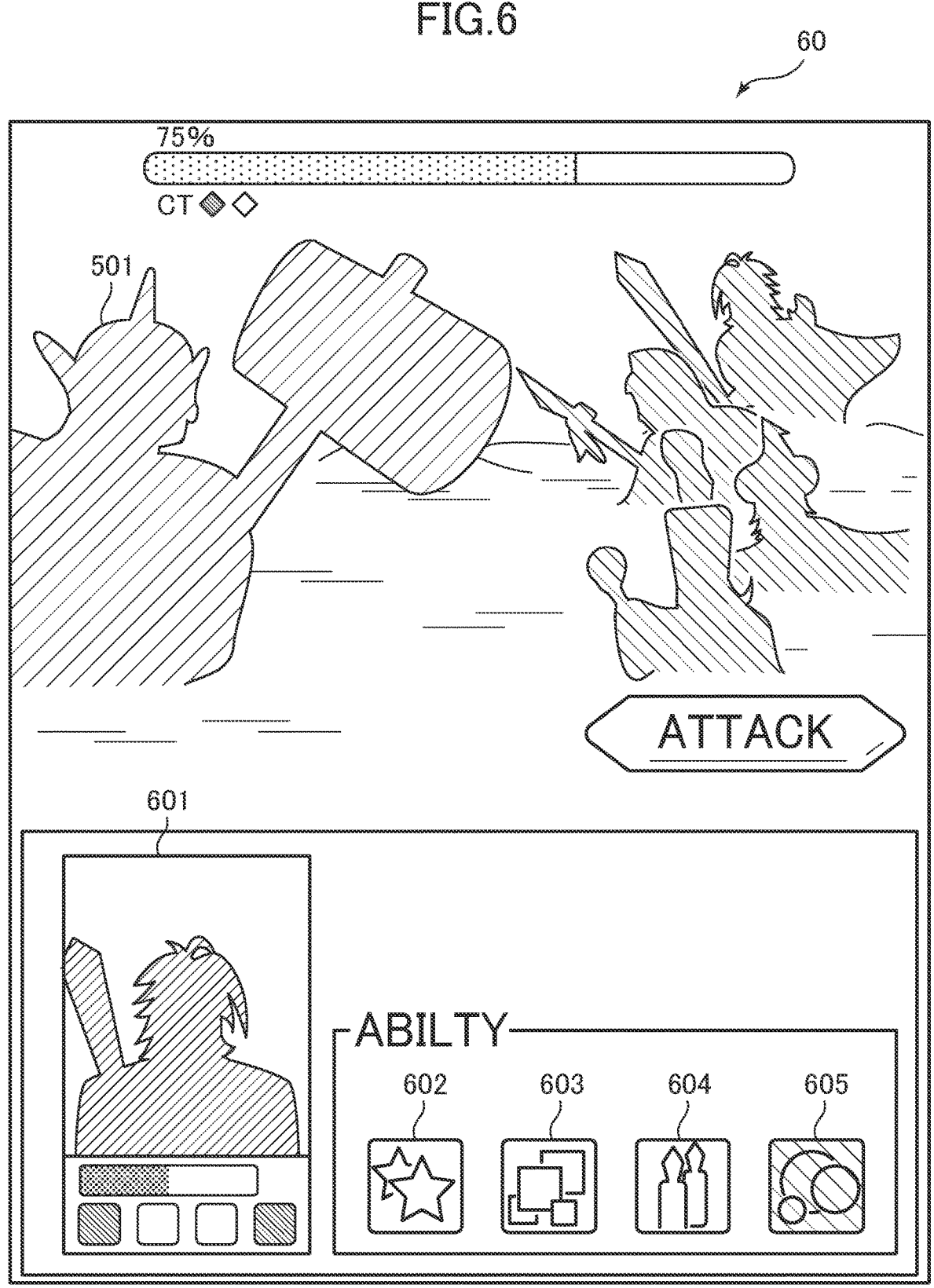
FIG. 6 shows an example of the game screen according to the embodiment of the present invention.

The second-action display buttons 531 to 534 are associated with the individual player characters, and, when the player touches any of the buttons, second-action buttons 602 to 605 that indicate actions of the second action type for a player character 601 associated with the touched button are displayed as shown in FIG. 6. The second-action buttons are associated with the individual actions of the second action type, and, when the player touches any of the second-action buttons, a command input for executing the action associated with the touched second-action button is sent to the server 20.

Furthermore, it is assumed that, when the player touches the first-action button in a state in which the defense buttons 541 to 544, shown in FIG. 5, have been turned on through touches by the player, transition to action processing of the enemy character is made while the player characters corresponding to the individual defense buttons do not execute any actions of the first action type and the second action type, whereas it is possible to take a defensive action for reducing damage caused by an attack by the enemy character.

The server 20 awaits to receive a command input from the player terminal 10, executes action processing of the player character on the basis of the received command input (S410), and updates the enemy common parameter, which is stored in the storage unit 45, on the basis of the executed action of the player character (S412).

For example, in the case where the command input is a command for executing an action of the first action type of any of the player characters, the server obtains the attacking power of the player character from the player-character parameter table (Table 4) on the basis of the PCID associated with the PID in the battle parameter table, and obtains the action content of the action ID "1", which indicates the first action type. Here, it is assumed that the first action type is "one attack". It is also possible that the first action type is set to an action, for example, one attack, common to all the player characters, whereby the first action is decided without referring to the player-character parameter table.

The server executes one attack against the enemy character on the basis of the attacking power of the player character, calculates damage to the enemy character on the basis of the obtained attacking power, and reduces the enemy HP in the battle parameter table. It is assumed that, in the case where the defense button is on, execution of any action is skipped. An animation for expressing the action of the player character, here, the attack against the enemy character, is generated as action executing processing of the player character.

Next, it is judged whether the executed action of the player character was of the second action type (S414). In the case where it is judged that the executed action was not of the second action type, action processing of the enemy character is executed (S416), and the battle parameter is updated on the basis of the executed enemy-character action (S418). The action of the enemy character is executed on the basis of information about the enemy next action stored in the storage unit 45.

In this embodiment, it is assumed that an enemy next action that is decided prior to a command input of the player is executed at the time of the enemy next action. This is performed in order to increase the predictability of an action of the enemy character.

In this embodiment, the battle parameter table, which is stored in the storage unit 45, includes the enemy next-action ID and the enemy-next-action target, and the action of the enemy character is executed on the basis of these items of information. The server 20 can obtain the content of an action by referring to the enemy parameter table. For example, when an action of the enemy character, which has the enemy ID "1", is executed against the PID "755", the server 20 refers to the enemy parameter table (Table 2) for the action ID "2" associated with this and obtains the action content. "four attacks, R-attacks". Then, on the basis of the enemy-next-action target shown in Table 1, the server 20 executes attack actions on the player characters (PCIDs "39", "45", "76", and "91") that are action targets.

Since the PCIDs "39", "45", "76", and "91" are attack targets here, the damage to each player character is calculated on the basis of the attacking power of the enemy character, to reduce the PCHPs of the individual player characters. In the case where any of the player characters performs a defensive action, the damage to this player character is reduced at a predetermined rate. It is assumed that, when the enemy-character action is executed, the enemy CT is incremented by one.

An animation for expressing the actions of the enemy character, here, the attacks against the player characters, is generated as action executing processing of the enemy character. Furthermore, in the case where notice information for an enemy next action, to be described later, has been presented, the presentation of the notice information is finished.

In one modification, it is also possible that, in the case where an enemy next action has a predetermined occurrence condition, whether the occurrence condition is satisfied is judged again after execution of a player-character action, and, is the case where the occurrence condition is not satisfied, the enemy next action is changed to another action. For example, it is assumed that a decided enemy next action is a special attack A, and the occurrence condition is "50%≥HP>40%". In the case where the occurrence condition was satisfied at the time of decision of the enemy next action, but the enemy HP is reduced to 40% or less after execution of a player-character action due to the attack by the player character and an attack by another player character, the enemy next-action information is changed to the normal attack.

After a powerful special action is decided as an enemy next action, the player acts strategically so as not to satisfy the occurrence condition for the powerful special action, thereby making it possible to avoid that special action. Since the enemy next action is decided once before an action of the player, the player can make a rational prediction including a change of the enemy next action. In the case where notice information is presented, the player can know the planned enemy next action, whereby the player can make a strategy for dealing with the enemy next action. As one strategy, a variation for changing the enemy next action can be given.

It is also possible that rejudgement about the occurrence condition is applied not to all actions of the enemy character but only to certain special actions thereof. For example, this can be realized by adding, to the enemy parameter table, information as to whether rejudgement about the occurrence condition is performed.

Furthermore, is the player-character action executing processing (S410), it is also possible to judge whether the suspension condition, which is included is the enemy next-action information, has been satisfied. In the case where it is judged that the suspension condition has been satisfied, it is possible to update the enemy next-action information to other enemy next-action information so as to change the enemy next action, in the battle-parameter updating processing (S412).

For example, in the case where the enemy next action is a "special attack G", and the suspension condition therefor is that a "suspension action" is executed by the player character, when the "suspension action" is executed by the player character, the enemy next-action ID is updated to ID "1", which indicates the normal action, in order to suspend the enemy next action "special attack G". Furthermore, it is also possible to send, to the player terminal 10, suspension information indicating that the enemy next action "special attack G" has been suspended. The player terminal 10 can present the information indicating that the enemy next action has been changed, by using the display unit 32. It is also possible to present the information to the player by outputting audio from an audio output unit (not shown) using a speaker or the like. Furthermore, it is also possible that displaying of the action name that was displayed as information indicating the next action is suspended, thereby indicating that the next action is changed.

The player performs an action so as to satisfy the suspension condition, thereby making it possible to change the enemy next action and to improve the strategy for the game.

It is also possible for the player to predict suspension of the enemy next action, which has already been decided at the time of a command input of the player, using the suspension condition predetermined therefor.

In the case where the action of the player character executed in S410 was of the second action type, the action of the enemy character is not executed. Here, the enemy-character action executing processing (S416) and the battle-parameter updating processing (S418) are skipped.

The server 20 generates action screen information that is based on the animations generated in the executed player-character action executing processing and the executed enemy-character player action executing processing and sends the action screen information to the player terminal 10 (S420). When the action screen information is received, the player terminal 10 displays, on the display unit 32, the animations, which express the actions of the player character etc., on the basis of the action screen information (S422). It as also possible to output audio by using the audio output unit.

The server 20 judges whether the battle has been terminated (S424). It is judged whether a predetermined battle termination condition has been satisfied, for example, whether the enemy HP has become 0, or whether the HPs of all the player characters have become 0. In the case where it is judged that the battle has been terminated, the server 20 sends a battle termination notification to the player terminal 10 (S426), and the server 20 terminates the battle processing with this player terminal 10 (S450). The player terminal 10 judges whether the battle termination notification has been received (S430). In the case where the battle termination notification has been received, the player terminal 10 displays termination of the battle on the display unit 32 and terminates the battle processing (S450).

In the case where it is judged that the battle has not been terminated, the server 20 decides an enemy character action to be executed next, on the basis of the enemy common parameter (S432) and updates the enemy next-action information, which is stored in association with the PID of the player (S434). It is also possible to decide the enemy next action on the basis of the enemy individual parameters, which are parameters of the enemy character and are different for each of the players, in addition to the enemy common parameter. Here, it is assumed that the enemy next action is decided on the basis of the enemy CT, which is one of the individual parameters, in addition to the enemy HP, which is the enemy common parameter.

Here, among actions for which the occurrence conditions are set, the action for which the occurrence condition is satisfied is decided as the enemy next action, and, in the case where there is no action for which the occurrence condition is satisfied, the normal action is executed. For example, in the case where the enemy ID is "1", and the enemy HP is 45%, the occurrence condition "50%≥HP>40%" for the action ID "2" is satisfied, whereby the corresponding action is decided as the enemy next action, and the enemy next-action information for the PID in the battle parameter table is updated. Furthermore, the PCID that becomes an action target of the enemy next action may also be decided. The flag of the enemy-next-action target for the PCID decided as the action target of the enemy next action is set (to 1), thereby making it possible to update the battle parameter table. The action target can be decided using, for example, a random number.

Next, it is decided whether the decided enemy next action is of the second action type (S436). In the case where the decided enemy next action is of the second action type, information indicating the enemy next action is sent to the player terminal 10 as notice information (S440). The player terminal 10 presents the notice information indicating the enemy next action, on the display unit 32 (S438). It is also possible to present the information to the player by using audio output from the audio output unit. In the case where the decided enemy next action is not of the second action type, notice information is not sent. Then, the player terminal 10 awaits a next command input from the player, and the server 20 returns to a step for awaiting to receive a command input from the player terminal 10.

The notice information is presented only for the second action type, which is a special attack, thereby making it possible to make the player pay more attention.

In a modification, it is also possible to send notice information for every enemy next action, regardless of the action type of an enemy next action. Furthermore, in another modification, it is also possible that notice information for every enemy next action is not sent to the player terminal 10. Since an enemy next action is decided before decision of a player action, the player can predict the enemy next action with high accuracy even in the case where the notice information is not presented.

Figure 7:
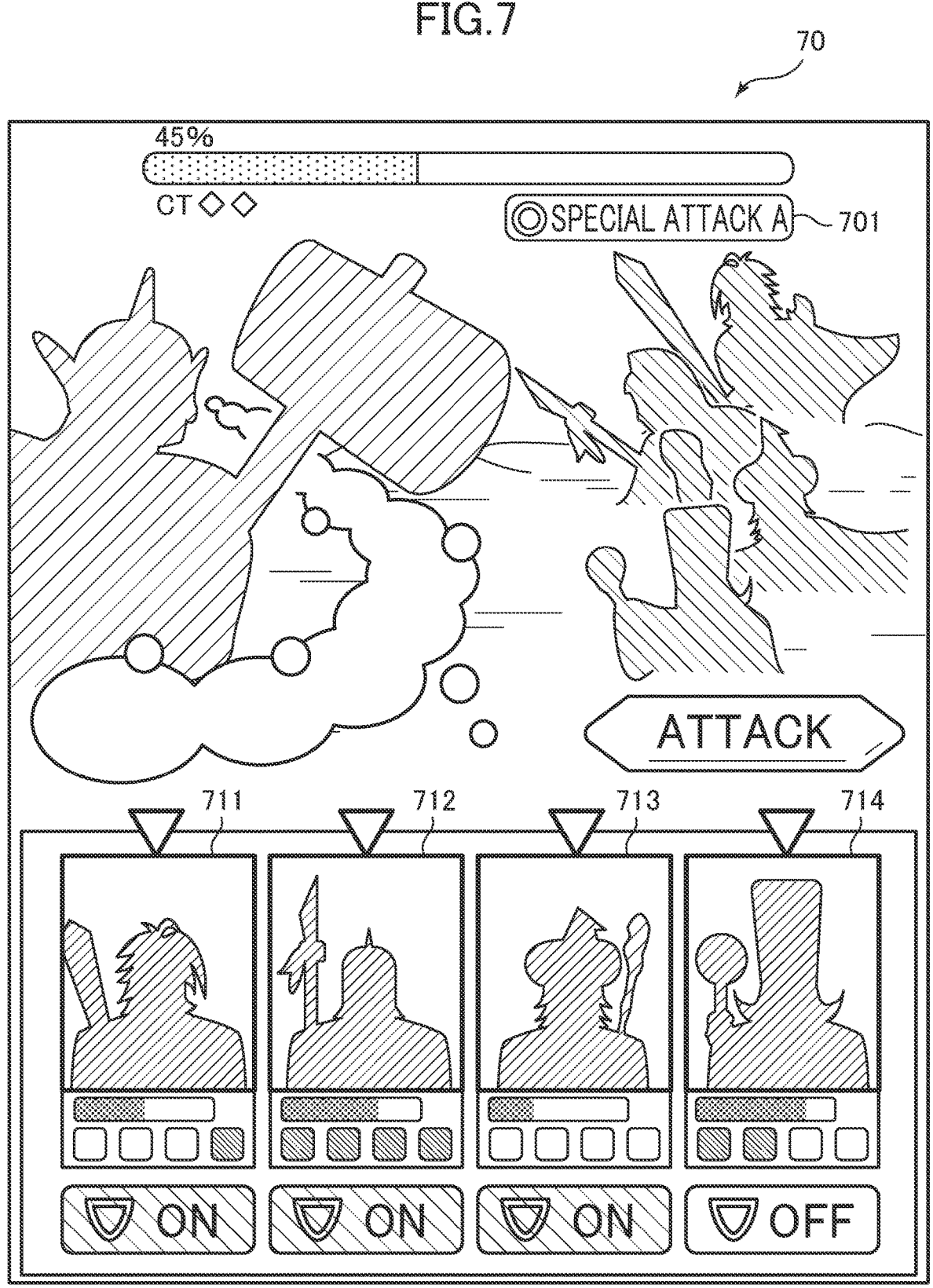
FIG. 7 shows an example of the game screen according to the embodiment of the present invention.

FIG. 7 shows an example of the game screen of the player terminal 10 displaying notice information. Here, an icon and a name (701) that indicate an enemy next action are displayed as information for noticing the enemy next action, and an additional production is displayed around the enemy character, thereby showing signs of execution of a special action. Furthermore, indicators (711 to 714) of arrows and squares are additionally displayed in regions showing the player characters, the indicators indicating that those player characters are attack targets. Here, it is indicated that all of the four player characters are attack targets of the special attack A.

Figure 8:
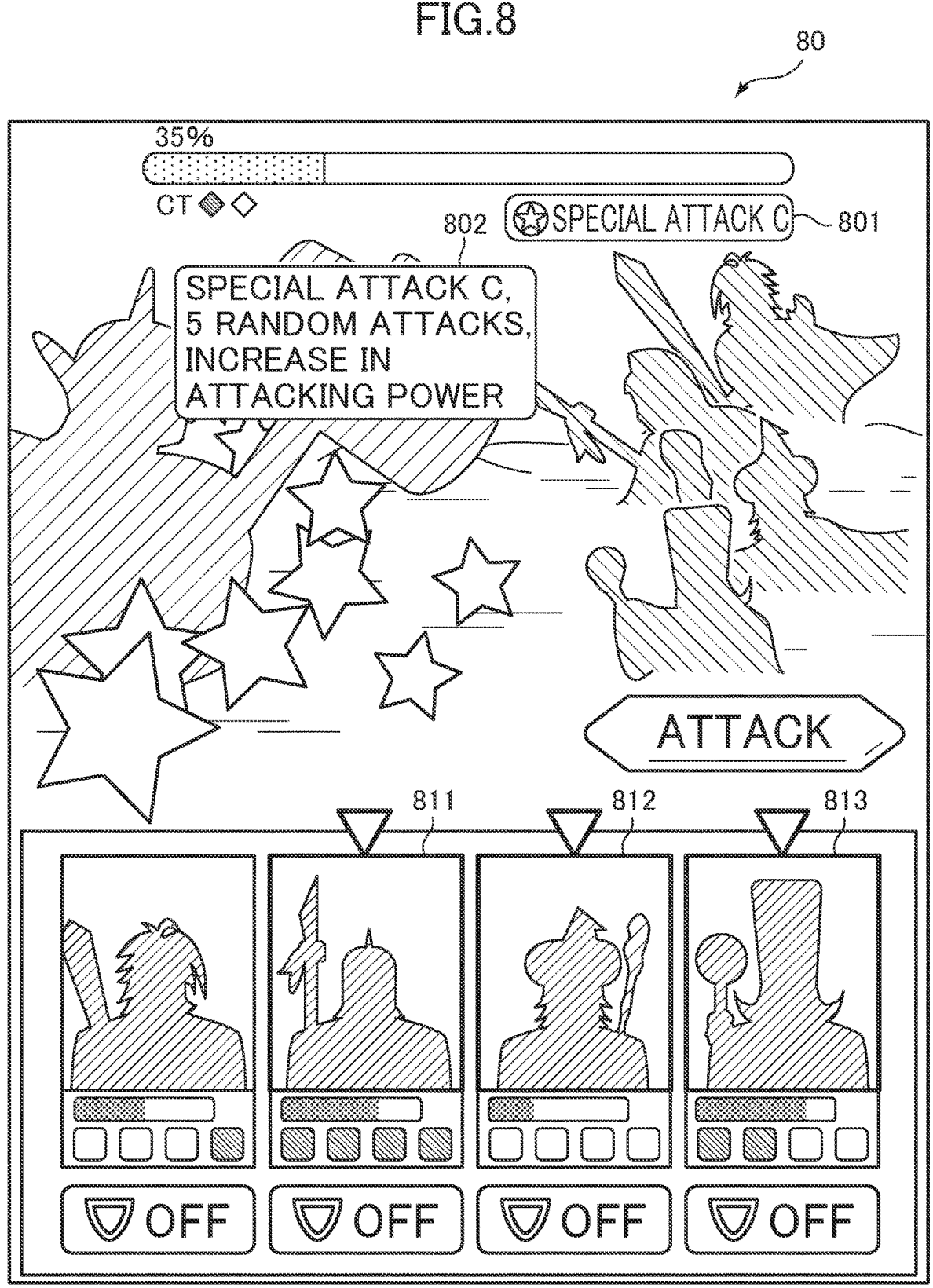
FIG. 8 shows an example of the game screen according to the embodiment of the present invention.

FIG. 8 shows another example of the game screen. Here, it is indicated that only three player characters that are indicated by indicators (811 to 813) are attack targets of a special attack C (801). Here, in addition to an enemy next action name, information (802) indicating detailed contents of the enemy next action is displayed in response to a player input for commanding detail display for a special attack. For example, the detail display can be performed when the player touches the enemy next action name (801). Furthermore, in the case where the enemy next action is an action for which the suspension condition has been set, it is also possible to present information indicating that the enemy next action can be suspended or indicating the suspension condition.

An example of the operation of this system using this embodiment will be described below. It is assumed that players A, B, and C battle against an enemy character D. It is assumed that the enemy character executes a special action A when 50%≥HP>40 is satisfied and executes a normal action in the other cases. When the enemy HP is 60%, execution of actions of the enemy character against all the players A, B, and C is finished, and the normal attacks are set as enemy next actions against all the players A, B, and C. Then, the players B and C do not perform a command input, and the player A executes a normal attack, whereby the enemy HP becomes 45%; thus, after the normal attack by the enemy character against the player A, the special action A is set as an enemy next action against the player A, and notice display is performed at the player terminal 10 of the player A. However, the enemy next actions against the players B and C are still the normal attacks, whereby notice display is not performed at the player terminals 10 of the players B and C.

After that, the player B executes the normal attack, and the normal attack by the enemy is executed, whereby the enemy HP becomes 44%; then, the special action A is decided as an enemy next action against the player B, and notice display is performed at the player terminal 10 of the player B. The enemy next action against the player C is still the normal attack, whereby notice display is not performed. Furthermore, the player A executes the next normal attack, whereby the enemy HP becomes 35%. Since the occurrence condition for the special action A is not satisfied, the normal attack is set as an enemy next action against the player A, whereas the special action A is maintained as the enemy next action against the player B. At the player terminal of the player A, the notice display is finished. Then, the player C executes the normal attack, whereby the enemy HP becomes 30%. Since the occurrence condition for the special action A is not satisfied, the normal attack is set as an enemy next action against the player C.

In this way, an enemy next action against each player is decided for the player after an enemy action against the player is executed, and the decided enemy next action against the player is not affected even when an action is executed by another player thereafter. While taking measures against an enemy next action for which notice display is being performed at each player terminal, an action of the player character can be decided.

By using this embodiment, after an action of the enemy character, a next action of the enemy character is decided before the start of standby for a command input with which the player decides a next action of the player character. The enemy action that has been decided with respect to the player is not changed due to the subsequent action(s) of the other player(s). Thus, it is possible to prevent an unexpected action of the enemy character from being executed due to an action etc., of another player, that cannot be known by the player. Therefore, it is possible to improve the predictability of the next action of the enemy character and to make full use of a player-character action that is strategically conceived by the player, whereby the fun of the game can be increased.

In a game in which a plurality of players battle against a common enemy, it is difficult for the player to fully grasp an action of another player. In particular, in a battle in which a number of players participate, the remaining HP of the enemy character are significantly reduced in a short time due to attacks by the other players, in some cases. It is not easy to provide, completely and in real time, such parameter information of the enemy character that varies in a short time. Therefore, it is known that update information related to the parameter of the enemy character is provided to the player in a discrete manner, i.e., in the case where the player performs an operation input, or at fixed time intervals.

For example, in the case where the parameter is updated and displayed every two seconds, even though an action of the player character is decided on the basis of the remaining enemy HP displayed two seconds before, and a command input is performed, the actual remaining HP of the enemy character at that time have already significantly varied, in some cases. If a next action of the enemy character is decided at the timing of a command input on the basis of the varied HP, an unexpected powerful attack by the enemy character is received, whereby the player characters are annihilated, in some cases. One of great attractions of this kind of game is to consider the abilities of player characters in order to avoid powerful attacks by the enemy, to select player characters for performing a battle, and to proceed with the battle while considering the ability execution timings for avoiding attacks. In spite of that, if a powerful attack is received at a timing unexpected from obtained information, the significance of making a strategy is lost, thereby resulting in a loss of appeal of the battle.

As in this embodiment, if a next action of the enemy character is decided before the player decides a next action of the player character, even in the case where information is provided in a discrete manner, the decided enemy next action is not affected by the subsequent change in the enemy-character parameter, which cannot be known by the player, whereby it is possible to effectively use the strategy made by the player and to increase the appeal of the battle.

Furthermore, it is also possible to suspend the enemy next action and to change the enemy next action to another action, by satisfying the suspension condition included in the enemy next-action information. With an action of the player, it is possible to change the enemy next action, thus making it possible to increase the strategy of the game. Furthermore, it is also possible for the player to predict suspension of the enemy next action, which has already been decided at the time of a command input of the player, using the suspension condition predetermined therefor. If the suspension condition is presented to the player as notice information for the enemy next action, the predictability can be further increased.

After an enemy next action is decided, when the enemy next action is executed, it is also possible to judge again whether the occurrence condition is satisfied. After a powerful special action is decided as an enemy next action, the player acts strategically so as not to satisfy the occurrence condition for the powerful special action, thereby making it possible to avoid that special acton. Since the enemy next action is decided once before an action of the player, the player can make a rational prediction including a change of the enemy next action. Then, it is possible to make it fun to make a strategy for changing the planned powerful enemy next action.

Furthermore, as in this embodiment, notice information for an enemy next action is presented to the player, thereby making it possible for the player to make a strategy on the basis of the accurate information. As an enemy character becomes more powerful, a powerful special action occurs frequently, and the action content thereof varies, in some cases. Before a battle is started, a player needs to search a strategy site etc. to collect information to find what kinds of special actions an enemy character executes on what occurrence conditions. The player feels that such effort is troublesome, and this becomes a reason to hesitate to participate in the battle.

As in this embodiment, notice information for an enemy next action is presented during a battle, thereby eliminating such preliminary information gathering and making it possible to easily grasp the enemy next action during the battle. Information about a player character that becomes the action target is also presented, thereby making it possible to select a more appropriate action, such as a defensive action of this player character.

The processing or operation described above can be modified freely as long as no inconsistency arises in the processing or operation, such as an inconsistency, that a certain step utilizes data that may not yet be available in that step. Furthermore, the examples described above are examples for explaining the present invention, and the present invention is not limited to those examples. The present invention can be embodied in various forms as long as there is no departure from the gist thereof.

REFERENCE SIGNS LIST 1 game system
2 network
10 player terminal
11 processor
12 display device
13 input device
14 storage device
15 communication device
16 bus
20 server
21 processor
22 display device
23 input device
24 storage device
25 communication device
26 bus
31 input unit
32 display unit
33 communication unit
34 game control unit
35 storage unit
41 input unit
42 display unit
43 communication unit
44 game control unit
45 storage unit
501 enemy-character image
503 enemy CT information
511, 512, 513, 514 player-character image
521 first-action button
531, 532, 533, 534 second-action display command button
541, 542, 543, 544 defense button
601 player character
602, 603, 604, 605 second-action button

The invention claimed is:

1. A non-transitory computer readable medium storing a program, when executed by a computer, is configured to perform a method comprising:
 a step for storing an enemy common parameter that is an enemy-character parameter common to a plurality of items of player identification information in a storage device;
 a step for storing enemy next-action information indicating an enemy next action that is an action planned to be executed next by an enemy character in the storage device so as to be individually associated with the plurality of items of the player identification information;
 a step for accepting a plurality of command inputs performed by a plurality of players in a game;
 a step for executing an action of a player character associated with the player identification information of a player among the plurality of players based on an accepted command input among the plurality of command inputs;
 a step for updating the enemy common parameter, which is stored in the storage device, based on the action of the player character;
 a step for executing, after receiving the accepted command input performed by the player, an action of the enemy character based on the enemy next-action information that is stored in the storage device in association with the player identification information;

a step for deciding, after executing the action of the enemy character and before accepting a next command input performed by the player, the enemy next action based on the enemy common parameter, which is stored in the storage device;

a step for updating the enemy next-action information that is associated with the player identification information in the storage device based on the enemy next action to produce an updated enemy next-action information; and a step of executing the enemy next action, wherein the updated enemy next-action information is maintained so that the updated enemy next-action information is not affected by changes in the enemy common parameter based on a plurality of actions of player characters of other players among the plurality of players after updating the enemy next-action information and executing the enemy next-action.

2. The non-transitory computer readable medium according to claim 1, wherein a player terminal of the player is connected to the computer, and wherein causing the computer to further execute, after executing the step for deciding the enemy next-action information, a step for sending notice information for the decided enemy next action to the player terminal.

3. The non-transitory computer readable medium according to claim 2, wherein a type of an action of the enemy character includes a first enemy-action type and a second enemy-action type; and wherein the step for sending notice information is executed in response to a type of the enemy next action is the second enemy-action type.

4. The non-transitory computer readable medium according to claim 1, wherein a type of an action of a player character includes a first player-action type and a second player-action type, and wherein causing the computer to execute, in response to the action executed in the step for executing an action of a player character is an action of the second player-action type, the step for deciding the enemy next action and the step for updating the enemy next-action information, without executing an action of the enemy character.

5. The non-transitory computer readable medium according to claim 1, wherein causing the computer to further execute a step for storing enemy individual parameters that are parameters of the enemy character different for each of the plurality of items of the player identification information, in the storage device in association with each of the plurality of items of the player identification information, and wherein the step for deciding the enemy next action includes a step for deciding the enemy next action with respect to each of the plurality of items of the player identification information based on the enemy common parameter and the enemy individual parameters that are stored in association with this player identification information.

6. The non-transitory computer readable medium according to claim 1, wherein the enemy next-action information includes an action name and an action target.

7. The non-transitory computer readable medium according to claim 1, wherein the enemy next-action information, which is associated with each of the plurality of items of the player identification information, includes a suspension condition for suspending the enemy next action, and wherein causing the computer to further execute:

a step for judging whether the suspension condition, which is included in the enemy next-action information, has been satisfied; and a step for updating the enemy next-action information of which the suspension condition is judged to have been satisfied, to enemy next-action information indicating another enemy next action.

8. The non-transitory computer readable medium according to claim 7, wherein causing the computer to further execute a step for sending suspension information for notifying the player that the enemy next action has been changed, to a player terminal.

9. A server comprising a processor and being configured to perform a method comprising:

storing an enemy common parameter that is an enemy-character parameter common to a plurality of items of player identification information in a storage device;

storing enemy next-action information indicating an enemy next action that is an action planned to be executed next by an enemy character, in the storage device so as to be individually associated with the plurality of items of the player identification information;

accepting a plurality of command inputs performed by a plurality of players in a game;

executing an action of a player character associated with the player identification information of a player among the plurality of players based on an accepted command input among the plurality of command inputs;

updating the enemy common parameter, which is stored in the storage device, based on the action of the player character;

executing, after accepting a command input performed by the player, an action of the enemy character based on the enemy next-action information that is stored in the storage device in association with the player identification information;

deciding, after executing the action of the enemy character and before accepting a next command input performed by the player, the enemy next action based on the enemy common parameter, which is stored in the storage device;

updating the enemy next-action information that is associated with the player identification information of the player in the storage device based on the enemy next action to produce an updated enemy next-action information; and executing the enemy next action, wherein the updated enemy next-action information is maintained so that the updated enemy next-action information is not affected by changes in the enemy common parameter based on a plurality of actions of player characters of other players among the plurality of players after updating the enemy next-action information and executing the enemy next-action.

10. A computer-implemented method comprising:

a step for storing an enemy common parameter that is an enemy-character parameter common to a plurality of items of player identification information in a storage device;

a step for storing enemy next-action information indicating an enemy next action that is an action planned to be executed next by an enemy character in the storage device so as to be individually associated with the plurality of items of the player identification information;

a step for accepting a plurality of command inputs performed by a plurality of players in a game;

a step for executing an action of a player character associated with the player identification information of a player among the plurality of players based on an accepted command input among the plurality of command inputs;

a step for updating the enemy common parameter, which is stored in the storage device, based on the action of the player character;

a step for executing, after accepting a command input performed by the player, an action of the enemy character based on the enemy next-action information that is stored in the storage device in association with the player identification information;

a step for deciding, after executing the action of the enemy character and before accepting a next command input performed by the player, the enemy next action based on the enemy common parameter, which is stored in the storage device;

a step for updating the enemy next-action information that is associated with the player identification information in the storage device based on the enemy next action to produce an updated enemy next-action information; and a step of executing the enemy next action, wherein the updated enemy next-action information is maintained so that the updated enemy next-action information is not affected by changes in the enemy common parameter based on a plurality of actions of player characters of other players among the plurality of players after updating the enemy next-action information and executing the enemy next-action.

11. A system comprising:

a server and a plurality of player terminals of a plurality of players that are connected to the server, wherein the server is configured to perform a first method comprising:

storing an enemy common parameter that is an enemy-character parameter common to a plurality of items of player identification information in a storage device;

storing enemy next-action information indicating an enemy next action that is an action planned to be executed next by enemy character in the storage device so as to be individually associated with each of the plurality of items of the player identification information;

accepting a plurality of command inputs performed by the plurality of players in a game;

executing an action of a player character associated with the player identification information of a player among the plurality of players based on an accepted command input among the plurality of command inputs;

updating the enemy common parameter, which is stored in the storage device, based on the action of the player character;

executing, after receiving the accepted command input performed by the player, an action of the enemy character based on the enemy next-action information that is stored in the storage device in association with the player identification information;

deciding, after executing the action of the enemy character and before accepting a next command input performed by the player, the enemy next action based on the enemy common parameter, which is stored in the storage device;

updating the enemy next-action information that is associated with the player identification information in the storage device based on the enemy next action to produce an updated enemy next-action information; and executing the enemy next action, and wherein a player terminal among the plurality of player terminals is configured to perform a second method comprising:

accepting a command input performed by the player and sending the command input to the server, wherein the updated enemy next-action information is maintained so that the updated enemy next-action information is not affected by changes in the enemy common parameter based on a plurality of actions of player characters of other players among the plurality of players after updating the enemy next-action information and executing the enemy next-action.

* * * * *